UNITED STATES PATENT OFFICE.

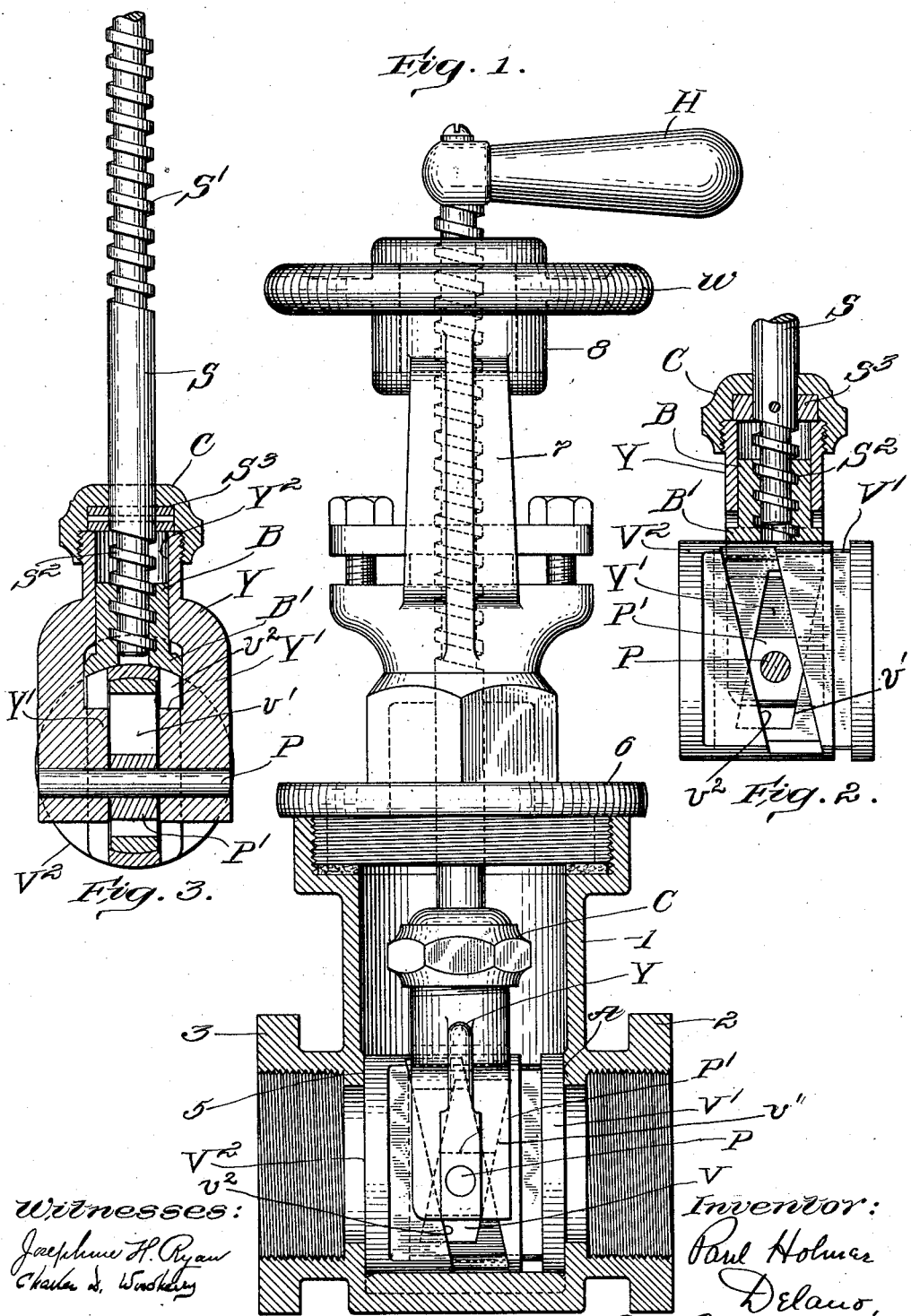

PAUL HOLMES DELANO, OF KINGSTON, MASSACHUSETTS.

VALVE.

1,057,226.  Specification of Letters Patent.  Patented Mar. 25, 1913.

Application filed May 27, 1912. Serial No. 700,087.

*To all whom it may concern:*

Be it known that I, PAUL HOLMES DELANO, a citizen of the United States, and resident of Kingston, in the county of Plymouth and State of Massachusetts, have invented new and useful Improvements in Valves, of which the following is a specification.

My invention relates to gate valves of the type represented by the structure described in United States Letters Patent No. 983,960, dated February 14, 1911, and granted to Alexander Watson. In this type of gate valve, two valve members are employed which are telescopically related one to the other and provided with oppositely inclined bearing surfaces, by means of which a valve lifter which engages with the said bearing surfaces imparts to the valve members a telescoping motion by which the valve is seated or unseated, and a motion of translation away from the seat after the manner of a gate valve. In some instances, particularly where a valve is used to control the flow of fluid under high pressure, the typical contrivance shown in the said Watson patent is not capable of completely preventing dragging contact between the valve surfaces and their complemental seats, and this for the reason that at the first movement of the valve lifter to open the valve, the fluid pressure admitted to the valve casing forces one or both of the valve members into contact with the seats, resisting the telescoping movement, so that the lifting movement results in frictional contact between the valves and the seats, causing wear and subsequent leakage. The invention hereinbelow described is addressed to this situation.

In the drawings hereto annexed which illustrate an example of my invention,— Figure 1 is a view in elevation and partly in section of a valve embodying my improvements; Fig. 2 is a view in elevation and partly in section of a valve and lifter, the section being taken in the plane of the axis of the valve; and Fig. 3 is a vertical cross-section of the valve and lifter.

The mechanically associated parts shown in the accompanying drawings, are as follows: The valve shell comprises a casing 1, having threaded fluid openings 2 and 3, and a hood 6 surmounted by columns 7 which are joined at the top by the boss 8. The valve consists of the telescopically related members $V'$, $V^2$ in which are formed the oppositely inclined slots $v'$, $v^2$ which afford the oppositely inclined bearings with which the lifter engages. The lifter Y is a yoke, which has formed upon it, preferably integrally, two inclined blocks $Y'$ which slide in the slot bearings $v^2$. A pin P passes through the lower end of the lifter and carries the slide $P'$ which travels in the inclined bearing slot $v'$. In its upper portion the lifter Y has formed in it a cylindrical chamber $Y^2$, in which the block B is mounted to slide. This block B is enlarged at its base to form the foot $B'$ which is adapted to bear upon one or both of the valve members $V'$, $V^2$. The lifter Y is surmounted by a cap C which is recessed to accommodate the collar $S^3$ which is pinned to the stem S. The stem S is mounted to slide in the hood 6 and is threaded at $S'$ and $S^2$. The thread $S'$ passes through the wheel-nut W, which is internally threaded to receive it, while the thread $S^2$ passes into the block B which is internally threaded to receive it. These threads are of the same pitch and direction. The stem S is surmounted by a handle H. The stem S may turn on its axis in the yoke Y, but is prevented from moving otherwise in relation to the yoke by the collar $S^3$ which is confined in the cap C. The stem may, however, slide vertically in the hood 6. The telescoping movement of the valve members $V'$, $V^2$, occurs whenever the yoke or lifter Y moves relatively to the valve members; in the illustration shown an upward movement of the yoke Y in relation to the valve members will cause the latter to telescope together, while the reverse relative movement will cause the valve members to move apart. It is this telescoping movement which effects the seating or unseating of the valve, and in the construction shown this movement is regulated and controlled by the turning of the stem S on its axis. The movement of the lifter and valve after the manner of a gate valve is controlled by the longitudinal movement of the stem S in response to the turning of the wheel-nut W. Thus the wheel-nut W constitutes part of the means by which the valve and its lifter is raised in the valve casing, while the handle H which turns the stem S on its own axis constitutes part of the means by which the telescoping movement of the valve members is controlled.

The operation of the above described mechanism is as follows: Fig. 1 represents the valves in a closed position; the valve members V', V², are in their lowermost position resting upon the bottom of the valve casing 1, that is to say, the wheel-nut W has been turned in a righthanded or clockwise direction as far as it will go. The valve members V', V², are telescopically expanded so that they bear firmly against their respective seats, that is to say, the yoke Y has been forced downward in relation to the valve members by means of the screw-thread S², the stem S' having been turned lefthanded or anti-clockwise as far as it will go by means of the handle H. To open the valve the handle H is first given a righthanded turning movement which causes the block B to move away from the collar S³ and cap C, lifting the yoke Y and telescoping the valve members V', V² upon each other. This movement is continued until the valve members are so far freed from contact with their seats that no looseness between the yoke which travels in guides, as shown in the Watson patent aforesaid, will be sufficient to allow either valve member to make contact with its seat. The unseating movement being completed, the wheel-nut W is turned lefthanded or anti-clockwise, lifting the stem S, the yoke Y and the valve members V', V², as a unit into the chamber of the casing 1 provided for the purpose. The closure of the valve is effected by the reverse of the above described movements performed in the reverse order; the collapsed valve is turned down to its bearing in the casing by turning the wheel-nut W righthanded, and then the handle H is turned lefthanded, causing the block B and the collar S (and therefore the yoke Y) to approach each other thus telescoping the valve members V', V², outward until they find their seats. The telescoping movement and the valve lifting movement are thus accomplished by distinct means, and these are so coördinated that the seating telescoping movement need not take place until after the lowering or gate movement is completed. When the valve members are seated as above described, the valve will be practically locked, so that the wheel-nut W will not respond to any attempt to open the valve until after the handle H has been turned to collapse the valve members and unseat them. The supplemental seating and unseating mechanism is positive in its action.

What I claim and desire to secure by Letters Patent is:

1. In a valve of the character described, the combination of telescopically related valve members having oppositely inclined bearing surfaces, a lifter provided with engagements with said bearing surfaces, means to raise and lower the lifter and valve members, and positive supplemental means to move the lifter in relation to the valve members, to seat or unseat the valve.

2. In a valve of the character described, the combination of telescopically related valve members having oppositely inclined bearing surfaces, a lifter provided with engagements with said bearing surfaces, means to raise and lower the lifter and valve members, and independent, positive, supplemental means to move the lifter in relation to the valve members, to seat or unseat the valve.

3. In a valve of the character described, the combination of telescopically related valve members having oppositely inclined bearing surfaces, a lifter slidingly engaged with said bearing surfaces, a stem mounted to turn on its axis in the lifter, and threaded to engage a bearing block, said block, mounted in the lifter to engage a valve member; means to raise and lower the lifter and valve members; and means to turn the stem in the lifter to move the lifter in relation to the valve members, to seat or unseat the valve.

4. In a valve of the character described, the combination of a casing, telescopically related valve members, having oppositely inclined bearing surfaces, a lifter slidingly engaged with said bearing surfaces, a stem mounted to turn on its axis in the valve lifter, and threaded to engage a bearing block, said block mounted in the lifter to engage a valve member, said stem mounted to slide in relation to the valve casing, and threaded to engage an external controlling nut, said controlling nut, and means at the external end of the stem to turn it on its axis to move the lifter in relation to the valve.

Signed by me at Boston, Massachusetts, this thirteenth day of May 1912.

PAUL HOLMES DELANO.

Witnesses:
 ODIN ROBERTS,
 CHARLES D. WOODBERRY.